(12) United States Patent
Yamanouchi et al.

(10) Patent No.: US 11,884,169 B2
(45) Date of Patent: Jan. 30, 2024

(54) EXTERIOR STRUCTURE OF VEHICLE

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 842 days.

(21) Appl. No.: 16/929,732

(22) Filed: Jul. 15, 2020

(65) Prior Publication Data
US 2021/0016670 A1    Jan. 21, 2021

(30) Foreign Application Priority Data

Jul. 19, 2019 (JP) ................................. 2019-133397

(51) Int. Cl.
| | | |
|---|---|---|
| *B60L 53/16* | (2019.01) | |
| *B60R 19/48* | (2006.01) | |
| *B60K 35/00* | (2006.01) | |
| *G01S 17/08* | (2006.01) | |
| *B60W 60/00* | (2020.01) | |
| *G01S 17/86* | (2020.01) | |

(52) U.S. Cl.
CPC .............. *B60L 53/16* (2019.02); *B60K 35/00* (2013.01); *B60R 19/48* (2013.01); *B60K 2370/797* (2019.05); *B60W 60/0025* (2020.02); *B60W 2420/42* (2013.01); *B60W 2420/52* (2013.01); *G01S 17/08* (2013.01); *G01S 17/86* (2020.01)

(58) Field of Classification Search
CPC ......... B60L 53/16; B60R 16/48; B60R 19/48; B60K 2370/797
See application file for complete search history.

(56) References Cited

U.S. PATENT DOCUMENTS

| | | | |
|---|---|---|---|
| 2008/0192984 A1 | 8/2008 | Higuchi et al. | |
| 2012/0019206 A1* | 1/2012 | Sekido | B60L 50/66 320/109 |
| 2013/0095678 A1* | 4/2013 | Hara | H01R 13/447 439/136 |
| 2014/0073147 A1 | 3/2014 | Ohno | |
| 2015/0102627 A1* | 4/2015 | Pickartz | B60L 53/16 296/97.22 |
| 2017/0229053 A1 | 8/2017 | Ishizuka et al. | |
| 2018/0067210 A1 | 3/2018 | Matsuyama et al. | |
| 2018/0086217 A1* | 3/2018 | Scherdin | H01R 13/64 |
| 2018/0201138 A1* | 7/2018 | Yellambalase | B60L 53/16 |
| 2019/0176633 A1* | 6/2019 | Booth | B60L 53/60 |
| 2019/0344674 A1* | 11/2019 | Arai | B60L 53/16 |

(Continued)

FOREIGN PATENT DOCUMENTS

| | | |
|---|---|---|
| JP | 2008-197863 A | 8/2008 |
| JP | 2010-023636 A | 2/2010 |

(Continued)

*Primary Examiner* — Brian L Swenson
(74) *Attorney, Agent, or Firm* — Dinsmore & Shohl LLP

(57) ABSTRACT

An exterior structure of a vehicle includes a charging port for external charging and a sensor unit for automated driving. The sensor unit is provided on at least one surface of a front surface, a back surface, and a side surface of the vehicle, and is provided to protrude outside the vehicle from the surface. The charging port is provided below the sensor unit.

7 Claims, 8 Drawing Sheets

(56) References Cited

U.S. PATENT DOCUMENTS

2020/0094759 A1* 3/2020 Tanabe .................... B60R 19/24
2021/0358657 A1* 11/2021 Shabgard ................ B60L 53/18

FOREIGN PATENT DOCUMENTS

| JP | 2012-245842 A | 12/2012 |
| JP | 2017-140929 A | 8/2017 |
| JP | 2018-041205 A | 3/2018 |
| WO | 2012/153413 A1 | 11/2012 |
| WO | 2019/118350 A1 | 6/2019 |

* cited by examiner

EXTERIOR STRUCTURE OF VEHICLE

CROSS REFERENCE TO RELATED APPLICATION

This application claims priority to Japanese Patent Application No. 2019-133397 filed on Jul. 19, 2019, which is incorporated herein by reference in its entirety including the specification, claims, drawings, and abstract.

TECHNICAL FIELD

This specification discloses an exterior structure forming an appearance of a vehicle.

BACKGROUND

An exterior structure of a vehicle includes a plurality of exterior components. In brief, the exterior components refer to components which are visible from outside the vehicle among vehicle components, and include outer plate components such as outer panels, electric components such as headlights, and the like.

When the vehicle is an electrically driven vehicle such as an electric vehicle or a plug-in hybrid vehicle which can be externally charged, a charging port is provided as part of the exterior structure of the vehicle. A charging inlet which is connected to a charging connector outside the vehicle is provided in the charging port. For example, in JP 2010-23636 A, the charging port is provided in a front grille, a pillar, a rear bumper, or the like.

Incidentally, the vehicle is provided with a sensor for capturing information around the vehicle as an exterior component for automated driving. For example, in order to secure a wide visual field, the sensor may be provided to further protrude outward from other exterior components.

For example, a LiDAR unit is known as a sensor that measures a distance between the vehicle and an obstacle around the vehicle. Light Detection and Ranging (LiDAR) is a technique of measuring a distance to a surrounding object by using light, and, for example, the LiDAR unit is configured to include an emitter that emits laser light, a receiver that receives reflected light, and a motor that rotates the emitter and the receiver.

The laser light emitted from the emitter is reflected by an object, and the reflected light thereof is received by the receiver; and thereby, it is possible to obtain a distance from the receiver to the object. It is possible to deploy measurement distance data (hereinafter, appropriately, this data is described as measured distance data) on the object in a horizontal direction by rotating the emitter and the receiver around a vertical axis. In order to secure an angular range in the horizontal direction; namely, a horizontal viewing angle, the LiDAR unit is provided to further protrude outside the vehicle from an exterior surface of the vehicle, such as an outer panel (outer plate) of a body (vehicle body).

Here, when the charging port is disposed in the vicinity of a sensor unit that protrudes from the outer panel from which the LiDAR unit protrudes, when an external charging operation is performed, the sensor unit may be damaged, which is a concern.

For example, when the charging connector is plugged into and out of the charging inlet, in a case where the charging connector falls out of the hand of a user by mistake, the charging connector may come into contact with the sensor unit in the vicinity of the charging port, thus leading to damage to the sensor unit, which is a concern. In addition, during external charging where the charging connector is plugged into the charging inlet, when the charging cable moves by a strong force due to the foot of the user being caught by the charging cable connecting the charging connector to an external power source or the like, and comes into contact with the sensor unit, this contact may lead to damage to the sensor unit, which is a concern.

Therefore, an object in this specification is to provide an exterior structure of a vehicle which is capable of preventing damage to a sensor unit for automated driving which could otherwise be caused by contact between the sensor unit, and a charging connector or a charging cable, even when the sensor unit and a charging port are disposed close to each other.

SUMMARY

An exterior structure of a vehicle disclosed in this specification includes a charging port for external charging; and a sensor unit for automated driving. The sensor unit for automated driving is provided on at least one surface of a front surface, a back surface, and a side surface of the vehicle, and is provided to protrude outside the vehicle from the surface. Furthermore, the charging port is provided below the sensor unit.

According to the above-described configuration, since the charging port is provided below the sensor unit, even in a case where a charging connector falls when the charging connector is plugged into and out of a charging inlet, contact between the charging connector and the sensor unit is avoided. In addition, even when a charging cable moves by a strong force during external charging, the charging cable is prevented from coming into contact with the sensor unit provided above the charging port.

In addition, in the above-described configuration, the charging port and the sensor unit may be provided on the front surface or the back surface of the vehicle. In this case, the charging port and the sensor unit may be provided one above the other in a vertical direction at positions overlapping in a vehicle width direction.

According to the above-described configuration, a wiring connected to the charging port and a wiring connected to the sensor unit can be bound together, and a wiring space can be made compact.

In addition, in the above-described configuration, the charging port and the sensor unit may be provided on the front surface or the back surface of the vehicle. In this case, the charging port includes charging inlets that are connectable to a charging connector outside the vehicle, and a charging lid with which the charging inlets are exposable to and coverable from outside the vehicle. The charging lid is formed in a part of a bumper, and the charging inlets are accommodated on a vehicle interior side of the bumper.

According to the above-described configuration, a part of the bumper can be used as a place where the charging port is installed.

In addition, in the above-described configuration, the charging port and the sensor unit may be provided on the back surface of the vehicle. In this case, the sensor unit includes a LiDAR unit that measures a distance to an object in an area behind the vehicle, and a camera that captures an image of the area behind the vehicle. Furthermore, the LiDAR unit and the camera are provided one above the other in a vertical direction at positions overlapping in a vehicle width direction.

According to the above-described configuration, when measured distance data on an area behind the vehicle obtained by the LiDAR unit and captured image data on the area behind the vehicle obtained by the camera are superimposed, a position correction in the vehicle width direction between both sets of data can be omitted.

In addition, in the above-described configuration, an exterior display may be provided above the sensor unit, and a window may be provided above the exterior display.

According to the above-described configuration, the window, the exterior display, the sensor unit, and the charging port are disposed from above toward below. Since the charging port is disposed below the sensor unit, as compared to the case where the charging port is disposed above the sensor unit, it is possible to have a wider installation area of the window, and it is possible to obtain a wider view from the window in a cabin.

In addition, in the above-described configuration, the charging port may be provided adjacent to the sensor unit.

According to the above-described configuration, a common wiring space where the wiring connected to the charging port and the wiring connected to the sensor unit are routed in common can be provided in the vicinity of the charging port and the sensor unit.

According to the exterior structure of the vehicle disclosed in this specification, even when the sensor unit for automated driving and the charging port are provided close to each other, it is possible to prevent damage to the sensor unit which could otherwise be caused by contact between the sensor unit, and the charging connector or the charging cable.

BRIEF DESCRIPTION OF DRAWINGS

Embodiment(s) of the present disclosure will be described based on the following figures, wherein.

DESCRIPTION OF EMBODIMENTS

Hereinafter, the configuration of a vehicle 10 where an exterior structure of the vehicle 10 according to this embodiment is provided will be described with reference to the drawings. Incidentally, in FIGS. 1 to 8, a vehicle body front and rear direction is indicated by an axis denoted with reference sign FR, a vehicle width direction is indicated by an axis denoted with reference sign LH (left hand), and a vehicle height direction is indicated by an axis denoted with reference sign UP. The vehicle body front and rear axis FR has a vehicle front direction as a positive direction. The vehicle width axis LH has a vehicle width direction-left side as a positive direction. In addition, the vehicle height axis UP has an upper direction as a positive direction. These three axes are orthogonal to each other.

Incidentally, hereinafter, except where notes are particularly required, a front in the vehicle body front and rear direction is simply described as a front, and a rear in the vehicle body front and rear direction is simply described as a rear. In addition, an upper part in the vehicle height direction is simply described as an upper part, and a lower part in the vehicle height direction is simply described as a lower part.

<Overall Configuration>

Figure 1:
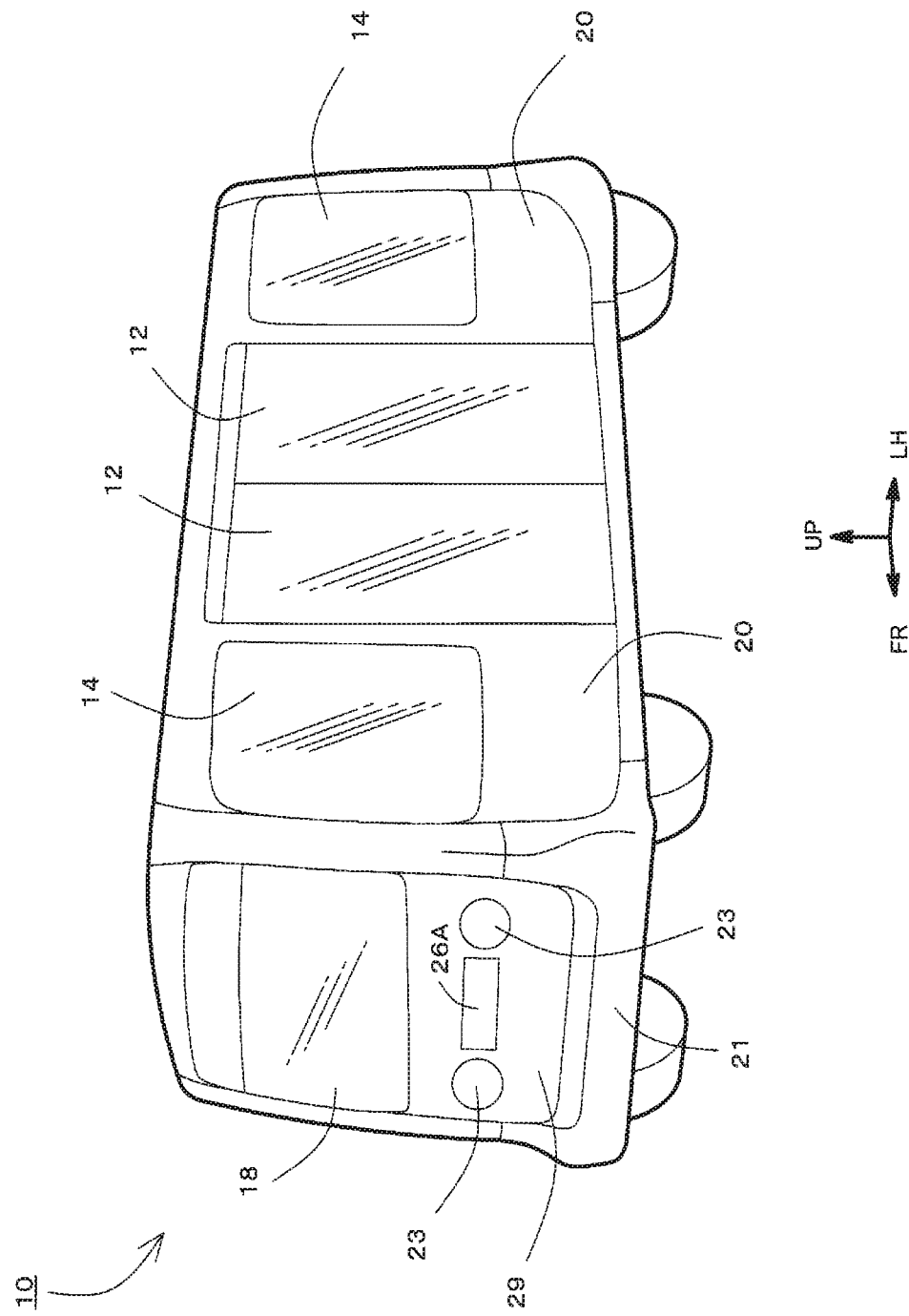
FIG. 1 is a perspective view of an appearance of a vehicle when a front surface and a left side surface of the vehicle are viewed from outside.
Figure 2:
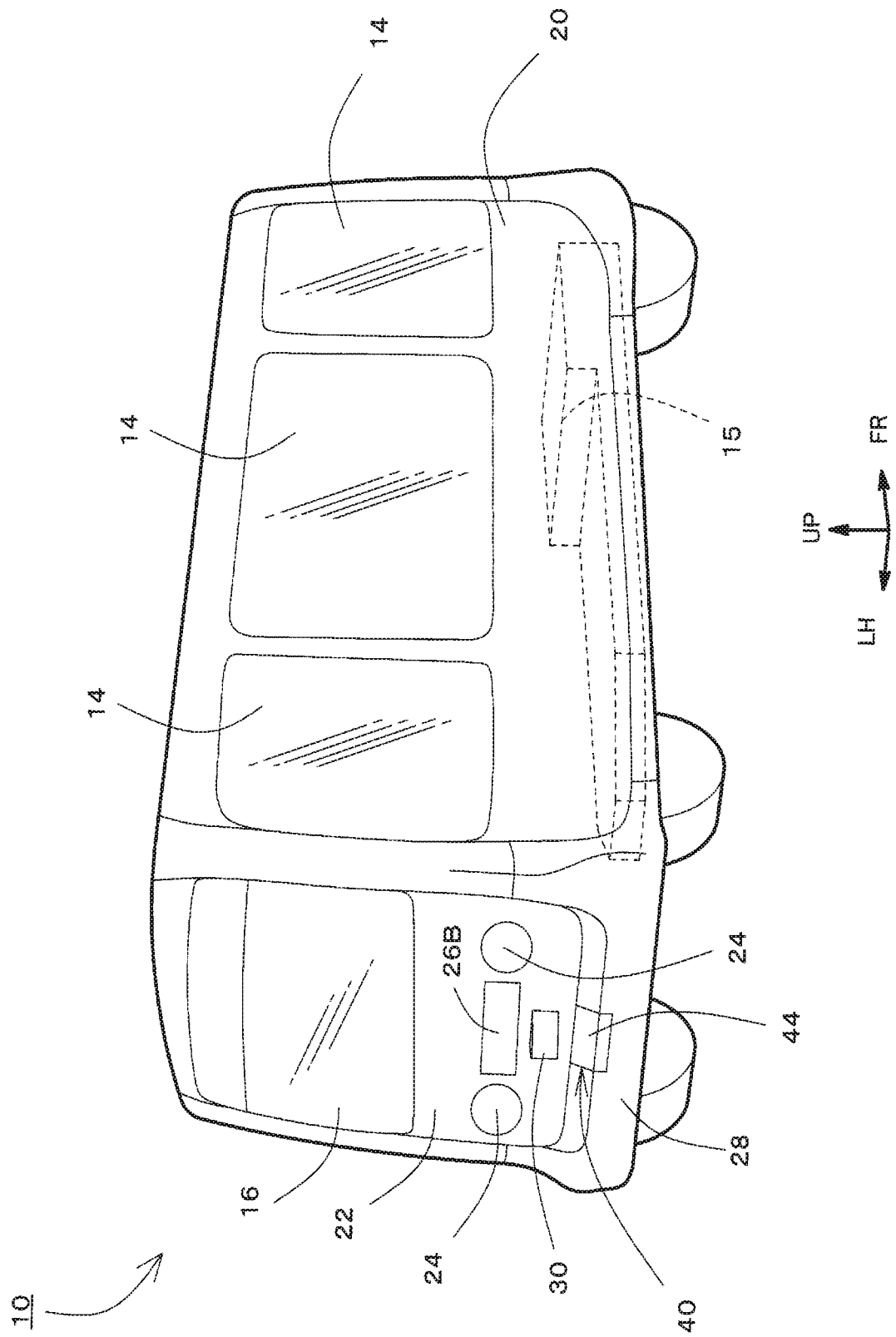
FIG. 2 is a perspective view of an appearance of the vehicle when a back surface and a right side surface of the vehicle are viewed from outside.

First, the overall configuration of the vehicle 10 will be briefly described with reference to FIGS. 1 and 2. FIGS. 1 and 2 are perspective views illustrating the appearance of the vehicle 10. FIG. 1 is a perspective view illustrating a front surface (front) and a vehicle left side surface of the vehicle 10. FIG. 2 is a perspective view illustrating a back surface (rear) and a vehicle right side surface of the vehicle 10.

In FIGS. 1 and 2, components indicated by the solid line; namely, components except a main battery 15 in FIG. 2, form the exterior structure of the vehicle 10. The exterior refers to the exterior design of the vehicle 10. Exterior components which are components forming the exterior structure refer to components which are visible from outside the vehicle among vehicle components.

The vehicle 10 has an automated driving function. For example, the vehicle 10 is operable from Level 0 (driver performs all operations) to Level 5 (full driving automation) based on the standards of Society of Automotive Engineers (SAE) of the United States. For example, an operation of the driver is required at least for some functions from Level 0 to Level 3. In addition, for example, in Level 4 (high automated driving), full automated driving in which an operation of the driver is not required is executed in a limited area; however, the driver is required in an area other than the limited area. In addition, in Level 5, in all situations, automated driving (full automated driving) which does not require the driver is executed.

The vehicle 10 is used, for example, as a passenger bus that travels in an automated driving mode along a prescribed route in a specific site with passengers on board in a cabin. Therefore, the vehicle 10 repeats stop and start relatively frequently. In addition, in the vehicle 10, entry doors 12, 12 are opened and closed relatively frequently to allow passengers to get on and off. In addition, the vehicle 10 travels at a relatively low speed (for example, 30 km/h or lower).

However, the usage mode of the vehicle 10 disclosed in this specification can be changed as appropriate. For example, the vehicle 10 may be used as a movable business space. In addition, for example, the vehicle 10 may be used as a store such as a retail store that displays and sells various products, or as a restaurant where foods are cooked and serviced. In addition, as another mode, the vehicle 10 may be used as an office where office work or meetings with customers are performed. In addition, the vehicle 10 may be used as a transport vehicle such as a taxi or a bus which transports customers or luggage. Furthermore, the usage scene of the vehicle 10 is not limited to business. For example, the vehicle 10 may be used as a personal movement apparatus. In addition, the travel pattern or the travel speed of the vehicle 10 may be changed as appropriate.

The vehicle 10 is, for example, an electric vehicle including a rotating electric machine as a drive source. The main battery 15 (refer to FIG. 2) which supplies electric power to the rotating electric machine is mounted in the vehicle 10. However, the vehicle 10 is not limited to the electric vehicle, and may be a vehicle that can be externally charged. For example, the vehicle 10 may be a plug-in hybrid vehicle in which an internal combustion engine (engine) and a rotating electric machine are mounted as drive sources and which is provided with a charging port 40 for external charging.

<Exterior Structure of Vehicle>

As illustrated in FIGS. 1 and 2, the vehicle 10 has a substantially symmetrical appearance in the front and rear direction. In addition, the vehicle 10 has an outward form with a substantially box shape (for example, a substantially rectangular parallelepiped shape) having a front surface and a back surface standing substantially vertically. A hood is not provided in the front surface of the vehicle, and a trunk and a back hatch are not provided in the back surface of the vehicle. Namely, the vehicle 10 has a structure where a passenger cannot move into and out of (get on and off) the vehicle from the front surface of the vehicle or the back surface of the vehicle and can move into and out of the vehicle, for example, only through the entry doors 12, 12 provided in the vehicle left side surface.

The front surface, the back surface, and the side surface of the vehicle refer to exposed surfaces. Therefore, for example, the front surface of the vehicle refers to an exposed surface at the front of the vehicle, the back surface of the vehicle refers to an exposed surface at the rear of the vehicle, and the side surface of the vehicle refers to an exposed surface at the side of the vehicle. The exposed surfaces are not limited to planar surfaces, and may include an uneven surface or a curved surface.

Referring to FIG. 1, side glasses 14, 14 which are window members are provided in the left side surface of the vehicle 10. In addition, the entry doors 12, 12 are provided at the center of the left side surface of the vehicle 10. The vehicle 10 is a left-hand traffic vehicle.

The entry doors 12, 12 are, for example, double sliding doors that are opened and closed by sliding in the front and rear direction of the vehicle. In addition, a majority of the entry doors 12, 12 are made of glass. As described above, a majority of the side surface of the vehicle 10 is covered with glass, and a side outer panel 20 which is an outer panel is provided in a remaining part thereof.

Referring to FIG. 1, a front glass 18 serving as a windshield is provided in the front surface of the vehicle 10. In addition, a front outer panel 29 which is an outer panel is provided below the front glass 18. Furthermore, a front bumper 21 is provided to be connected to a lower portion of the front outer panel 29.

The front bumper 21 is provided over the entire width of the vehicle 10 in the vehicle width direction, and is provided to protrude further ahead of the vehicle (namely, outside the vehicle) than the front outer panel 29. The front bumper 21 may have, for example, the same structure as that of a rear bumper 28 illustrated in FIG. 5, and is a hollow member including an upper wall and a side wall. The front bumper 21 is made of, for example, a resin material such as polypropylene, fiber reinforced plastic, or ABS resin.

A pair of headlamps 23, 23 (headlights) are provided in the front outer panel 29. Furthermore, an exterior display 26A is provided between the pair of headlamps 23, 23. For example, text such as a destination or a driving mode (during automated driving, during manual driving, or the like) is displayed on the exterior display 26A.

Referring to FIG. 2, a rear glass 16 is provided in an upper part of the back surface of the vehicle 10, and a rear outer panel 22 which is an outer panel is provided in a lower part of the back surface. A pair of tail lamps 24, 24 (tail lights) are provided in the rear outer panel 22.

Furthermore, an exterior display 26B is provided between the pair of tail lamps 24 and 24. Information for the following vehicles is displayed on the exterior display 26B. For example, as illustrated in FIG. 3, information such as "After You" is displayed on the exterior display 26B.

Referring to FIG. 2, the rear bumper 28 is connected to a lower portion of the rear outer panel 22. The rear bumper 28 is provided over the entire width in the vehicle width direction, and is provided to protrude further behind the vehicle; namely, outside the vehicle, than the rear outer panel 22. The rear bumper 28 is made of, for example, a resin material such as polypropylene, fiber reinforced plastic, or ABS resin.

Figure 5:
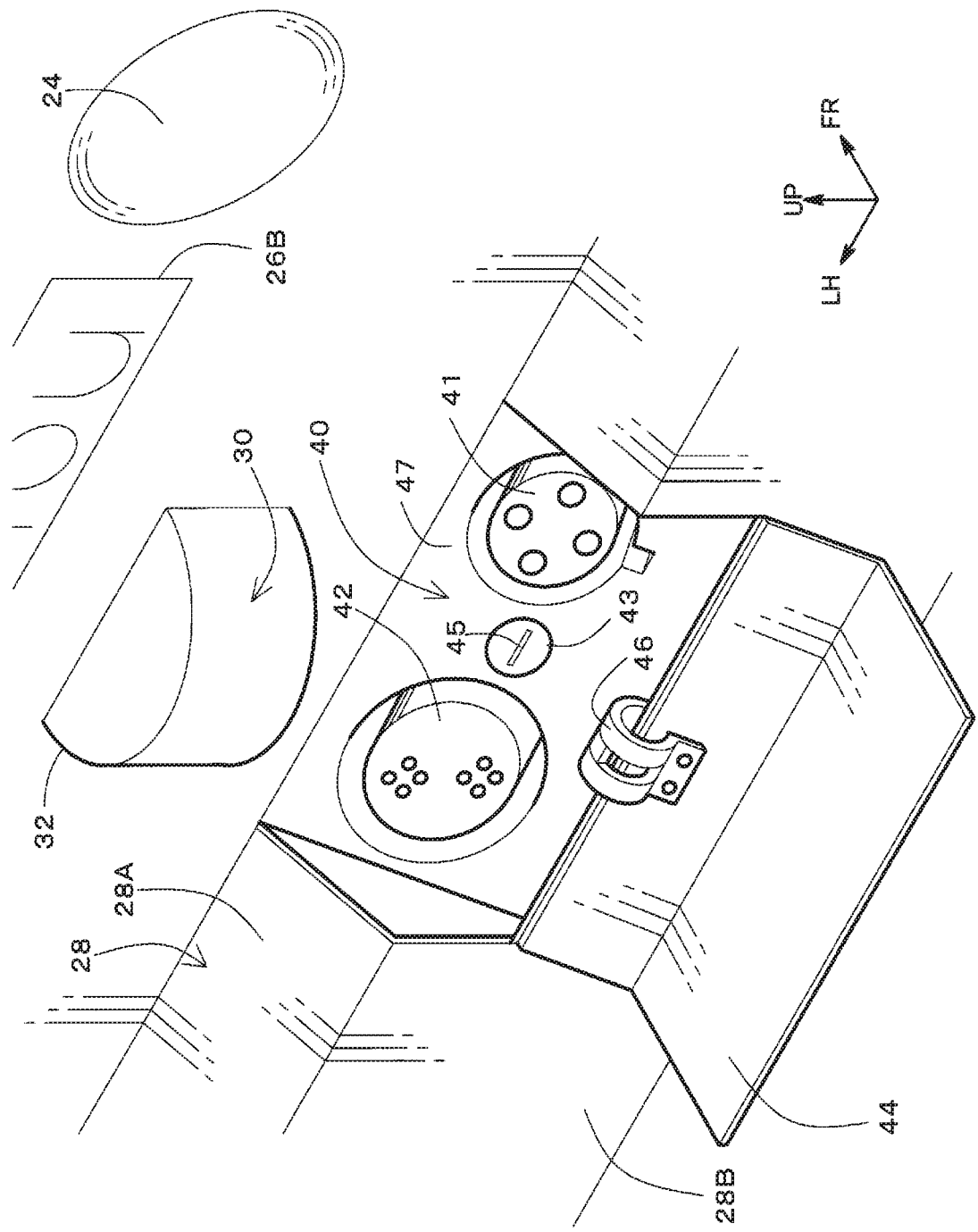
FIG. 5 is an enlarged perspective view of the area around the sensor unit on the back surface of the vehicle, and is a view illustrating a mode when a charging lid is in an open state.

Referring to FIG. 5, the rear bumper 28 is a hollow member including an upper wall 28A and a side wall 28B. As will be described later, a part of the rear bumper 28 is used as the charging port 40. Namely, a part of the upper wall 28A and the side wall 28B of the rear bumper 28 serve as a charging lid 44 which is a lid member of the charging port 40. In addition, a normal charging inlet 41, a fast charging inlet 42, and an exterior power switch 43 are accommodated on a vehicle interior side of the rear bumper 28. Details of that structure will be described later.

Figure 3:
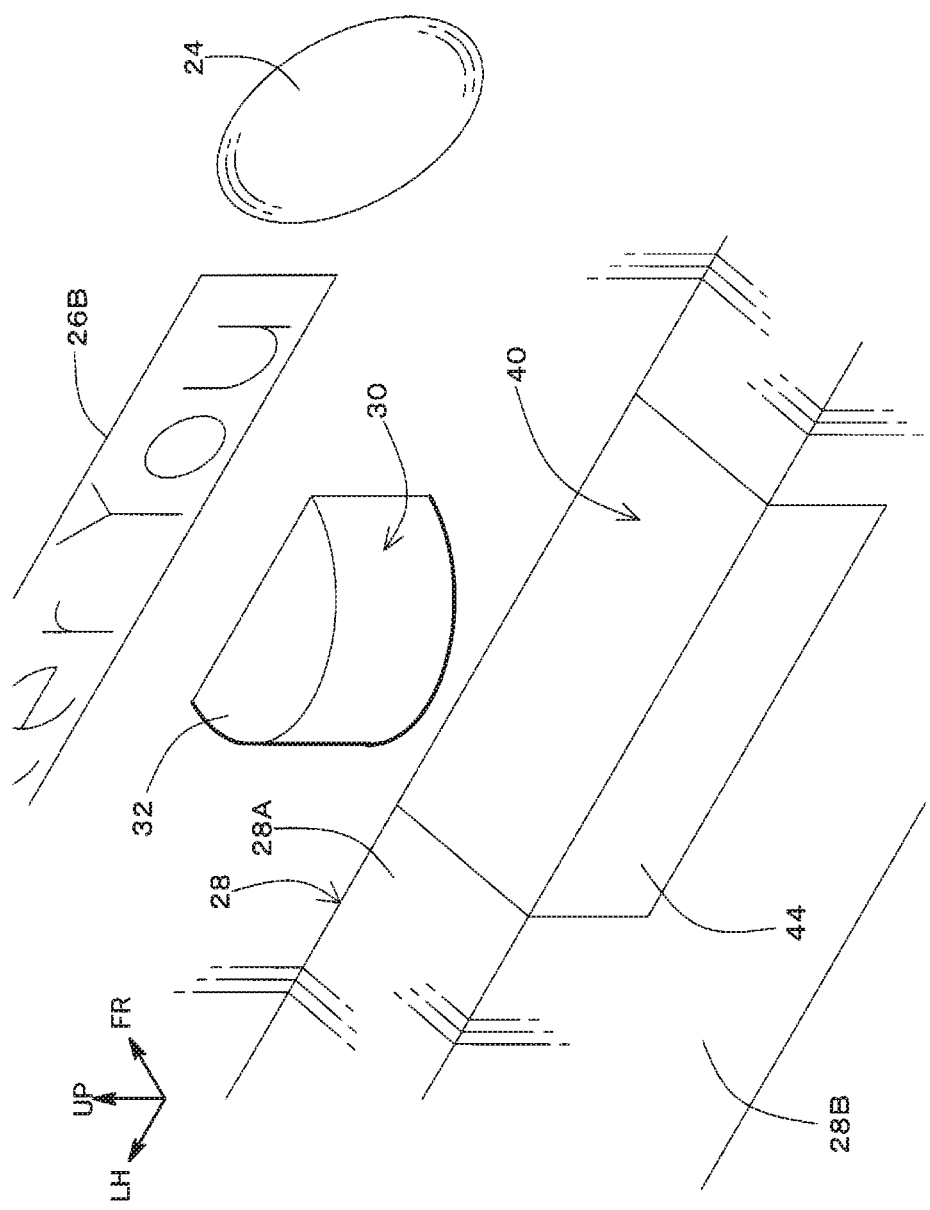
FIG. 3 is an enlarged perspective view of an area around a sensor unit on the back surface of the vehicle.

Referring to FIGS. 2 and 3, a sensor unit 30 is provided on the back surface of the vehicle. Namely, the sensor unit 30 is provided on the same surface (back surface) as a surface where the charging port 40 is provided. The sensor unit 30 is provided above the charging port 40. As will be described later, since the charging port 40 is provided below the sensor unit 30, during external charging, a charging connector 49 (refer to FIG. 6) and a charging cable (not illustrated) which connects the charging connector 49 to an external power source are prevented from coming into contact with the sensor unit 30.

Figure 7:
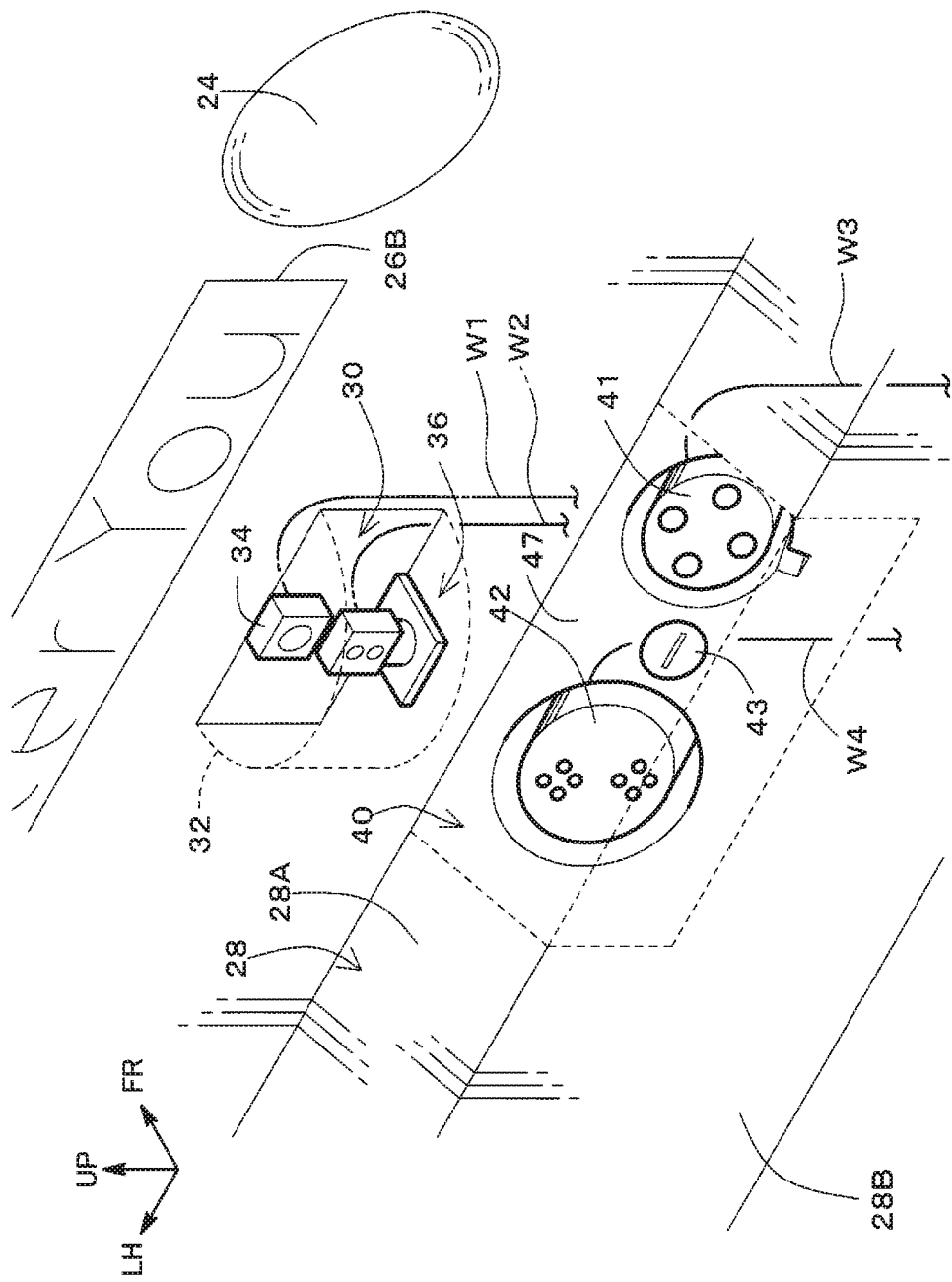
FIG. 7 is an enlarged perspective view of the area around the sensor unit on the back surface of the vehicle, and is a view describing the disposition of wirings of charging inlets, a LiDAR unit, and a camera.

As illustrated in FIGS. 2 and 3, the sensor unit 30 and the charging port 40 are provided one above the other in a vertical direction at positions overlapping in the vehicle width direction; more specifically, are provided vertically adjacent to each other. Since such a disposition is adopted, as illustrated in FIG. 7, a camera wiring W1 and a LiDAR wiring W2 which are connected to the sensor unit 30 and a normal charging wiring W3 and a fast charging wiring W4 which are connected to the charging port 40 are disposed (routed) close to each other. Therefore, for example, a routing scheme such as binding the wirings W1 to W4 together becomes possible, and it is possible to further compact a space for a wiring path as compared to the case where the sensor unit 30 and the charging port 40 are provided at positions that are shifted from each other in the vehicle width direction.

In addition, since the charging port 40 is provided adjacent to the sensor unit 30, a common wiring space where the camera wiring W1 and the LiDAR wiring W2 connected to the sensor unit 30 and the normal charging wiring W3 and the fast charging wiring W4 connected to the charging port 40 are routed in common can be provided in the vicinity of the charging port 40 and the sensor unit 30.

In addition, as illustrated in FIGS. 2 and 3, the sensor unit 30 and the charging port 40 are provided on the back surface of the vehicle at a central position in the vehicle width direction. In addition to the exterior display 26B provided between the pair of tail lamps 24, 24, since the sensor unit 30 and the charging port 40 are aligned at the central position in the vehicle width direction and these components are arranged in the vertical direction, for example, it is possible to obtain a more orderly appearance in design as compared to the case where these components are provided at different positions in the vehicle width direction.

Figure 4:
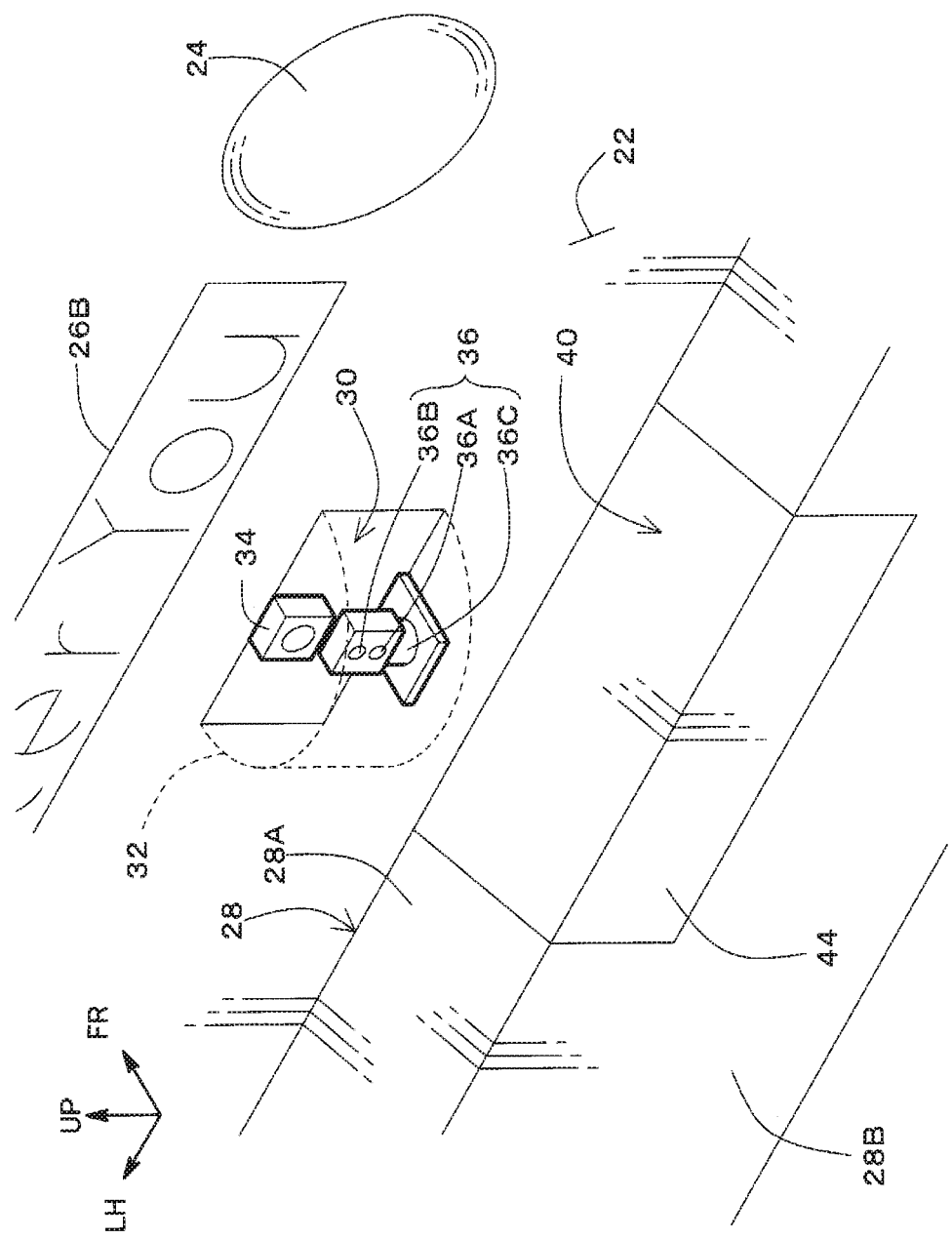
FIG. 4 is an enlarged perspective view of the area around the sensor unit on the back surface of the vehicle, and is a view illustrating an internal structure of a casing.

Referring to FIG. 3, the sensor unit 30 is provided to protrude outside the vehicle; in other words, behind the vehicle from the back surface of the vehicle (namely, an exposed surface at the rear of the vehicle where the charging port 40 is provided, and an attachment surface). Referring to FIGS. 3 and 4, the sensor unit 30 is configured to include a camera 34, a LiDAR unit 36, and a casing 32 that accommodates the camera 34 and the LiDAR unit 36.

The casing 32 protects the camera 34 and the LiDAR unit 36 from wind and rain, obstacles, or the like while securing the visual field thereof. The casing 32 is made of, for example, a light transmitting resin material. In addition, for example, the casing 32 has a half cylindrical shape which protrudes outside the vehicle (behind the vehicle) from the back surface of the vehicle.

The LiDAR unit 36 is a sensor unit for automated driving, and uses Light Detection and Ranging (LiDAR), a technique of measuring a distance to a surrounding object by using light. The LiDAR unit 36 is configured to include an emitter 36A that emits laser light, a receiver 36B that receives reflected light, and a motor 36C that rotates the emitter 36A and the receiver 36B.

For example, a light emitting surface of the emitter 36A and a light receiving surface of the receiver 36B are parallel to each other, and are aligned in the vehicle width direction and in the front and rear direction of the vehicle. In addition, for example, the emitter 36A and the receiver 36B are disposed one above the other in the vertical direction.

The emitter 36A emits laser light toward an area behind the vehicle 10. The emitter 36A may include a light source that emits lasers with a pulse of, for example, approximately 905 nm. When the laser light emitted from the emitter 36A hits an object, such as a following vehicle behind the vehicle 10, the reflected light thereof is received by the receiver 36B. A distance between a reflective surface (for example, the following vehicle) and the receiver 36B is obtained based on the time from the emitting of light of the emitter 36A to the reception of light of the receiver 36B. Hereinafter, distance measurement data are appropriately described as "measured distance data".

The motor 36C has a vertical axis (UP-axis) as a rotation axis, and rotates the emitter 36A and the receiver 36B around the rotation axis. The motor 36C may be, for example, a servo motor. When the emitter 36A and the receiver 36B are scanned in a horizontal direction by the motor 36C, measured distance data which are a measurement of a distance to an object in an area behind the vehicle 10 are deployed in the horizontal direction.

Furthermore, when a plurality of the light sources (for example, laser elements) of the emitter 36A are arranged in the vertical direction and a plurality of light receiving elements of the receiver 36B are arranged in the vertical direction, measured distance data on the area behind the vehicle can be obtained in two dimensions. For example, measured distance data on each point on an LH-UP plane which is a visual field behind the vehicle are obtained.

The camera 34 captures images of the area behind the vehicle 10. Namely, similar to the LiDAR unit 36, an image of the LH-UP plane which is the visual field behind the vehicle is acquired by the camera 34. The camera 34 includes, for example, an image sensor such as a CMOS sensor or a CCD sensor. In addition, for example, unlike the LiDAR unit 36, the camera 34 is not provided with a rotating mechanism, and a back surface of the camera 34 is fixed to the rear outer panel 22.

The camera 34 is formed, for example, as an electronic mirror unit for a rearview mirror. The electronic mirror unit for a rearview mirror is configured to include the camera 34 and an inner display inside the vehicle 10. The inner display is disposed in the vicinity of an operation booth (not illustrated) in the cabin, and an image captured by the camera 34 is displayed on the inner display rapidly, for example, within 200 milliseconds from the image capturing.

In addition, the image captured by the camera 34 can be used for automated driving control. For example, the image captured by the camera 34 and the measured distance data on the LH-UP plane captured by the LiDAR unit 36 are superimposed. Accordingly, it is possible to obtain, for example, a separation distance (intervehicular distance) between the following vehicle shown in the image captured by the camera 34 and the vehicle 10.

When the image data captured by the camera 34 and the measured distance data on the LH-UP plane acquired by the LiDAR unit 36 are superimposed, it is necessary to align LH-UP plane coordinates of the data (the image data and the measured distance data) with each other. In this regard, as illustrated in FIG. 4, the LiDAR unit 36, particularly, the emitter 36A and the receiver 36B, and the camera 34 are provided one above the other in the vertical direction in a state where the emitter 36A, the receiver 36B, and the camera 34 are aligned at the positions overlapping in the vehicle width direction. Since such a disposition is adopted, a position correction in the vehicle width direction between the image data acquired by the camera 34 and the measured distance data acquired by the LiDAR unit 36 can be omitted.

Referring to FIGS. 3 and 5, the charging port 40 is provided below the sensor unit 30. The charging port 40 is configured to include the normal charging inlet 41, the fast charging inlet 42, the exterior power switch 43, and the charging lid 44.

For example, the charging port 40 is formed in a part of the rear bumper 28. Specifically, the charging lid 44 is formed in a part of the rear bumper 28, and the normal charging inlet 41, the fast charging inlet 42, and the exterior power switch 43 are accommodated on the vehicle interior side of the rear bumper 28.

Depending on the opening and closing of the charging lid 44, the charging inlets 41 and 42 and the exterior power switch 43 can be exposed to and covered from outside the vehicle. Incidentally, the illustration of a locking and unlocking mechanism of the charging lid 44, for example, a locking mechanism or the like, is omitted.

The charging lid 44 is formed (cut off), for example, by making cuts in central portions of the upper wall 28A and the side wall 28B of the rear bumper 28 in the vehicle width direction. For example, two cuts in the front and rear direction of the vehicle are formed in the central portion of the upper wall 28A in the vehicle width direction. The two cuts extend to the side wall 28B. Furthermore, a cut in the vehicle width direction which connects the two cuts is formed immediately before a lower end of the side wall 28B. Accordingly, the charging lid 44 having an L shape in a side view (LH-axis view) is formed (cut off). Furthermore, since a hinge mechanism 46 having a longitudinal direction (LH-axis direction) of the rear bumper 28 as a rotation axis is provided in the charging lid 44, as illustrated in FIG. 5, the charging lid 44 can be opened and closed on a foreground side in the drawing.

Furthermore, the normal charging inlet 41, the fast charging inlet 42, and the exterior power switch 43 are accommodated inside a space where the charging lid 44 is formed in the rear bumper 28. These components are assembled to, for example, a base plate 47. For example, the base plate 47 is disposed inclined with respect to a horizontal plane to face the rear and the upper part of the vehicle. For example, the base plate 47 is fixed at an angle of 40° to 50° with respect to the horizontal plane in a side view (LH-axis view).

Since the base plate 47 is disposed in an inclined manner, the normal charging inlet 41, the fast charging inlet 42, and the exterior power switch 43 are exposed obliquely upward. Therefore, when the charging lid 44 which is made by cutting off a part of the upper wall 28A and the side wall 28B of the rear bumper 28 is open, an access to each inlet or the switch is facilitated.

Referring to FIG. 2, a half or more of the back surface of the vehicle is occupied by the rear glass 16, and an area where various components can be mounted is limited. As in this embodiment, when a part of the rear bumper 28 is used as a place where the charging port 40 is installed, a plurality of components can be disposed in the back surface of the vehicle.

In addition, since the plurality of components are disposed in the back surface of the vehicle, individual components are disposed close to each other. For example, the charging port 40 is provided below the sensor unit 30 in a state where the charging port 40 is separated from the sensor unit 30 in a range of 10 cm to 50 cm. As will be described later, in this embodiment, with respect to the sensor unit 30 and the charging port 40 which are disposed close to each other, the charging port 40 is provided below the sensor unit 30. Accordingly, when the charging connector 49 (refer to FIG. 6) falls, contact between the charging connector 49 and the sensor unit 30 is avoided. In addition, during external charging where the charging connector 49 is inserted into the normal charging inlet 41 or the fast charging inlet 42, even when the charging cable (not illustrated) moves by a strong force due to the foot of a user being caught by the charging cable connected to the charging connector 49 or the like, contact between the charging cable and the sensor unit 30 is avoided.

In addition, referring to FIG. 2, the exterior display 26B is provided above the sensor unit 30, and the rear glass 16 which is a window member is provided above the exterior display 26B. Namely, the rear glass 16, the exterior display 26B, the sensor unit 30, and the charging port 40 are disposed from above toward below in the back surface of the vehicle. Since the charging port 40 is disposed below the sensor unit 30, as compared to the case where the charging port 40 is disposed above the sensor unit 30, it is possible to have a wider installation area of the rear glass 16, and it is possible to obtain a wider view from inside the cabin.

Returning to FIG. 5, the charging port 40 is provided with the normal charging inlet 41 and the fast charging inlet 42 as charging inlets. Both of the normal charging inlet 41 and the fast charging inlet 42 are connected to the main battery 15 (refer to FIG. 2) via a charger (not illustrated). In addition, both the normal charging inlet 41 and the fast charging inlet 42 can be connected to the charging connector 49 (FIG. 6) outside the vehicle. The charging connector 49 is connected to the external power source (not illustrated) by the charging cable (not illustrated).

The normal charging inlet 41 is a charging port compatible with a household power source with an output of, for example, 200 V and 16 A, 100 V and 6 A, or the like. The fast charging inlet 42 is a charging port, for example, based on CHAdeMO (registered trademark) which is a charging standard. In order to prevent incorrect plugging-in, the normal charging inlet 41 and the fast charging inlet 42 are formed such that, for example, the diameters thereof are different therebetween or the positions and the number of terminal insertion holes are different therebetween.

The exterior power switch 43 is provided, for example, between the normal charging inlet 41 and the fast charging inlet 42. The exterior power switch 43 may be a key cylinder switch. For example, a keyhole 45 into which a mechanical key is inserted is provided in the exterior power switch 43. When the mechanical key which fits the shape of the keyhole is inserted into the keyhole 45, the keyhole 45 and a cylinder mechanism including the keyhole 45 are rotatable. When the cylinder mechanism is rotated, the cylinder mechanism is rotatable between an OFF position and an ON position.

For example, when the mechanical key is turned to cause the cylinder mechanism to rotate from the OFF position to the ON position, the vehicle 10 is activated from a non-travelable state (resting state) to a travelable state. Alternatively, when the exterior power switch 43 is switched from an OFF position to an ON position and an ON operation is performed on an interior power switch (not illustrated), the vehicle 10 is activated from the non-travelable state (resting state) to the travelable state.

Figure 6:
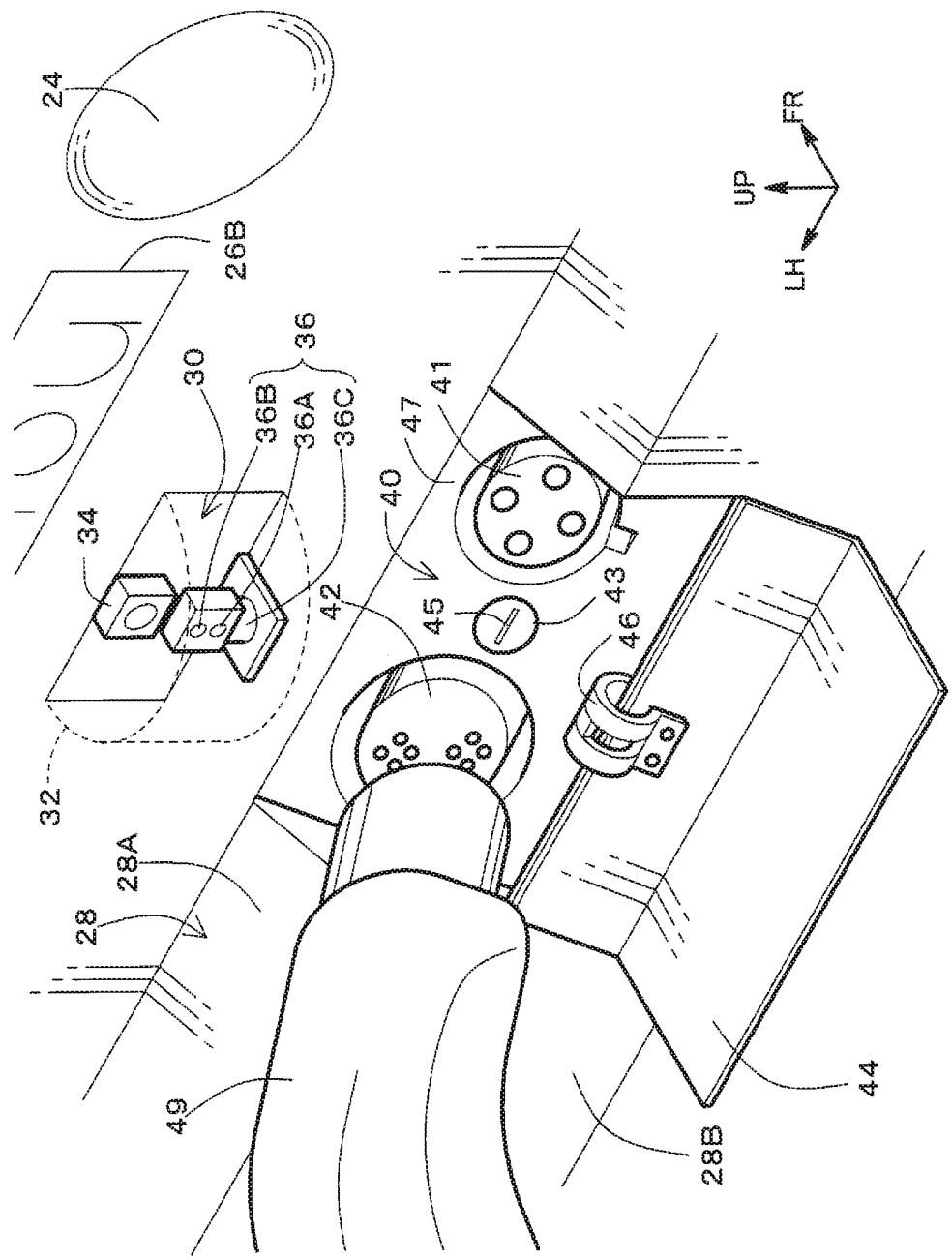
FIG. 6 is an enlarged perspective view of the area around the sensor unit on the back surface of the vehicle, and is a view describing a positional relationship between a charging connector and the sensor unit.

FIG. 6 illustrates an external charging mode. The charging connector 49 provided outside the vehicle is plugged into the normal charging inlet 41 or the fast charging inlet 42. At this time, the charging connector 49 may slip out of the hand of a user (for example, a driver) holding the charging connector 49 and the charging connector 49 may fall by mistake, which is a concern.

In this case, in the exterior structure of the vehicle according to this embodiment, the charging port 40 is provided below the sensor unit 30, and thus, when the charging connector 49 falls during external charging, the sensor unit 30 is outside a falling path thereof. Accordingly, the contact between the charging connector 49 and the sensor unit 30 is prevented.

In addition, when the charging connector 49 is plugged into the normal charging inlet 41 or the fast charging inlet 42 and external charging is performed, the charging cable (not illustrated) may move by a strong force due to the foot of the user being caught by the charging cable running on the ground from the charging connector 49 to the external power source (not illustrated) or the like, which is a concern.

In this case, in the exterior structure of the vehicle according to this embodiment, since the charging port 40 is provided below the sensor unit 30; in other words, the sensor unit 30 is, so to speak, evacuated above the charging port 40, even when the charging cable moves by a strong force, the charging cable is prevented from coming into contact with the sensor unit 30.

Another Example of Exterior Structure of Vehicle According to this Embodiment

In FIGS. 2 to 7, the sensor unit 30 and the charging port 40 are provided on the back surface of the vehicle; however, the disclosure is not limited to this form. In brief, when the sensor unit 30 and the charging port 40 are provided on at least one surface of the front surface, the side surface, and the back surface of the vehicle 10, the charging port 40 may be disposed below the sensor unit 30.

For example, referring to FIG. 1, the sensor unit 30 and the charging port 40 may be provided on the front surface of the vehicle. In this case, the exterior display 26A is provided below the front glass 18 which is a window member, the sensor unit 30 is provided below the exterior display 26A, and the charging port 40 is provided below the sensor unit 30. In this case, the charging lid 44 of the charging port 40 may be provided in a part of the front bumper 21; for example, in a central portion in the vehicle width direction. Furthermore, the normal charging inlet 41, the fast charging inlet 42, and the exterior power switch 43 are accommodated on a vehicle interior side of the front bumper 21.

Figure 8:
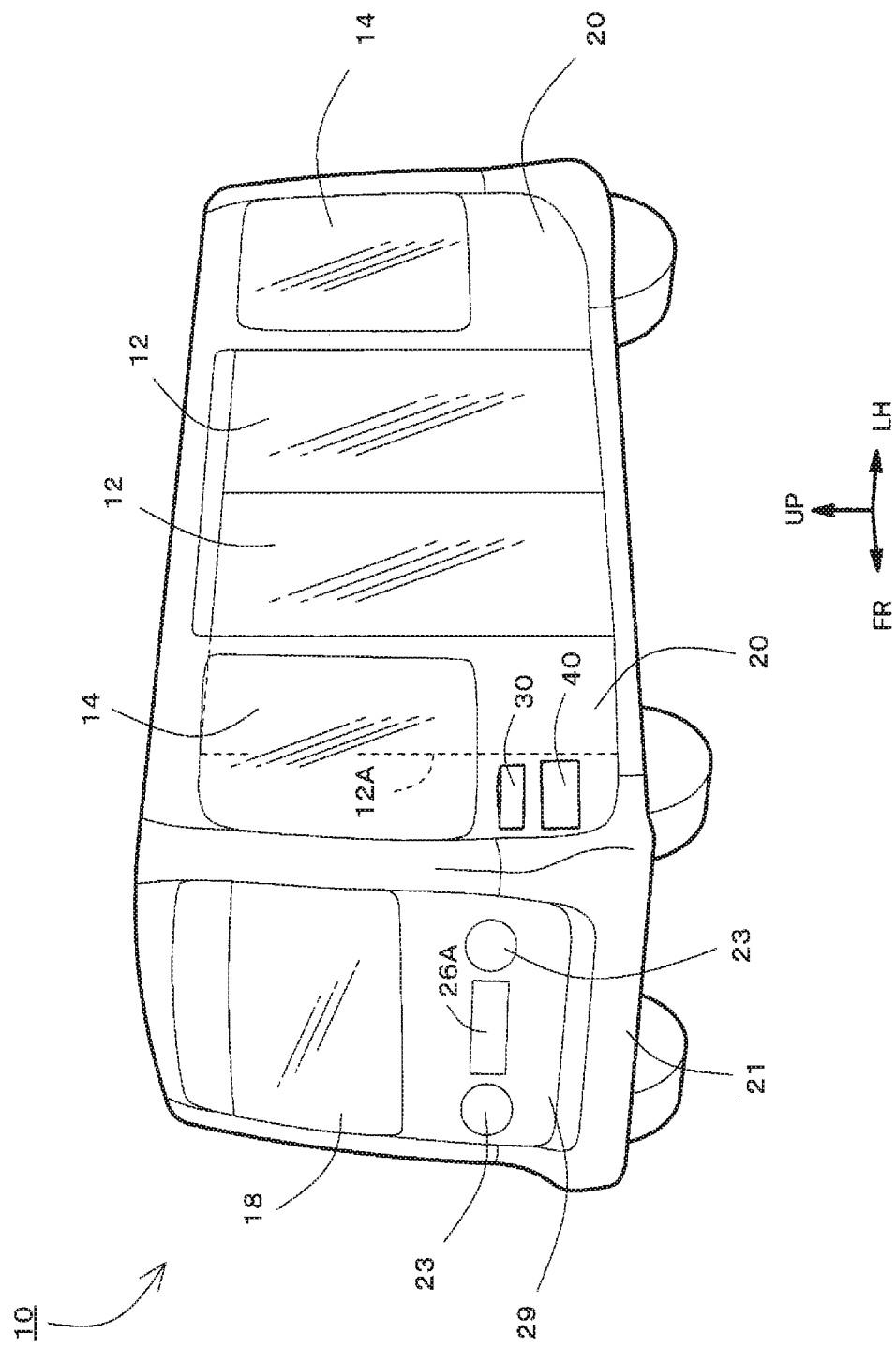
FIG. 8 is another example of the exterior structure of the vehicle according to this embodiment, is a perspective view when the front surface and the left side surface of the vehicle are viewed from outside, illustrating an example where the sensor unit and the charging port are provided on the left side surface.

In addition, for example, as illustrated in FIG. 8, the sensor unit 30 and the charging port 40 that is installed therebelow may be provided on the side surface (left side surface) of the vehicle 10.

As described above, the entry doors 12, 12 are provided in the left side surface of the vehicle 10. Since the sensor unit 30 protrudes outward from the left side surface of the vehicle 10 in the vehicle width direction, the sensor unit 30 may be provided in a place that is outside a path when the entry doors 12, 12 are opened and closed in a sliding manner. For example, the sensor unit 30 may be provided in the side outer panel 20 in a space in front of a side end position 12A when the entry door 12 is opened. In addition, the charging port 40 is provided below the sensor unit 30.

The present disclosure is not limited to the present embodiments described above, and includes all changes and modifications without departing from the technical scope or the essence of the present disclosure defined by the claims.

The invention claimed is:

1. An exterior structure of a vehicle comprising:
a charging port for external charging; and
a sensor unit for automated driving which is provided on at least one surface of a front surface, a back surface, and a side surface of the vehicle, and is provided to protrude outside the vehicle from the at least one surface,
wherein the charging port is provided below the sensor unit, and the charging port and the sensor unit are provided on the front surface or the back surface of the vehicle, and are provided one above the other in a vertical direction at positions overlapping in a vehicle width direction.

2. The exterior structure of the vehicle according to claim 1,
the charging port includes charging inlets that are connectable to a charging connector outside the vehicle, and a charging lid with which the charging inlets are exposable to and coverable from outside the vehicle, the charging lid is formed in a part of a bumper, and the charging inlets are accommodated on a vehicle interior side of the bumper.

3. The exterior structure of the vehicle according to claim 1,
wherein the charging port and the sensor unit are provided on the back surface of the vehicle,
the sensor unit includes a LiDAR unit that measures a distance to an object in an area behind the vehicle, and a camera that captures an image of the area behind the vehicle, and
the LiDAR unit and the camera are provided one above the other in a vertical direction at positions overlapping in a vehicle width direction.

4. The exterior structure of the vehicle according to claim 1,
wherein an exterior display is provided above the sensor unit, and
a window is provided above the exterior display.

5. The exterior structure of the vehicle according to claim 1,
wherein the charging port is provided adjacent to the sensor unit.

6. An exterior structure of a vehicle comprising:
a charging port for external charging; and
a sensor unit for automated driving which is provided on at least one surface of a front surface, a back surface, and a side surface of the vehicle, and is provided to protrude outside the vehicle from the at least one surface,
wherein the charging port is provided below the sensor unit,
wherein the charging port and the sensor unit are provided on the back surface of the vehicle,
wherein the sensor unit includes a LiDAR unit that measures a distance to an object in an area behind the vehicle, and a camera that captures an image of the area behind the vehicle, and
wherein the LiDAR unit and the camera are provided one above the other in a vertical direction at positions overlapping in a vehicle width direction.

7. The exterior structure of the vehicle according to claim 6,
wherein the charging port and the sensor unit are provided on the front surface or the back surface of the vehicle,
the charging port includes charging inlets that are connectable to a charging connector outside the vehicle, and a charging lid with which the charging inlets are exposable to and coverable from outside the vehicle,
the charging lid is formed in a part of a bumper, and
the charging inlets are accommodated on a vehicle interior side of the bumper.

* * * * *